United States Patent [19]

Brandt et al.

[11] 4,258,791
[45] Mar. 31, 1981

[54] THERMAL INSULATION METHOD

[75] Inventors: Israel M. Brandt, Plano; Forrest A. Scearce, Houston, both of Tex.

[73] Assignee: NL Industries, Inc., New York, N.Y.

[21] Appl. No.: 116,584

[22] Filed: Jan. 29, 1980

[51] Int. Cl.³ .................. E21B 36/00; E21B 43/24
[52] U.S. Cl. .................................. 166/302; 166/57; 166/DIG. 1; 166/288; 252/8.55 R; 252/62
[58] Field of Search ............ 166/302, DIG. 1, 288, 166/294, 57; 175/65, 69; 252/8.55 R, 8.55 D, 8.5 P, 8.5 M, 62

[56] References Cited

U.S. PATENT DOCUMENTS

| | | |
|---|---|---|
| 2,946,746 | 7/1960 | Keller, Jr. et al. ............... 252/8.5 P |
| 3,168,475 | 2/1965 | Jordan et al. ............... 252/8.55 R X |
| 3,494,865 | 2/1970 | Andrews, Jr. et al. .......... 252/8.5 M |
| 3,642,624 | 2/1972 | Howland et al. .............. 252/8.55 R |
| 3,650,327 | 3/1972 | Burnside ............................ 166/303 |
| 3,719,601 | 3/1973 | Jacocks ........................... 166/302 X |
| 3,831,678 | 8/1974 | Mondshine .......................... 166/288 |
| 3,899,026 | 8/1975 | Culter ......................... 166/DIG. 1 X |

Primary Examiner—Stephen J. Novosad
Attorney, Agent, or Firm—Browning, Bushman & Zamecki

[57] ABSTRACT

A method of insulating a well bore with a pumpable, oil base packer fluid which gels to a thick grease-like consistency at elevated temperatures, the packer fluid comprising a liquid oleaginous phase, an aqueous phase, an oleophilic polymer such as a copolymer of maleic anhydride and a long chain alpha-olefin, a water-in-oil emulsifier and lime.

17 Claims, No Drawings

THERMAL INSULATION METHOD

BACKGROUND OF THE INVENTION

The present invention relates to a method of insulating a well bore with an oil base packer fluid.

Permafrost is a thick layer of frozen surface ground which may be several hundred feet thick. Commonly, in recovering oil and gas through permafrost zones, several concentric casing strings are set through the permafrost. Water and water based muds used in the drilling operation tend to accumulate between the casing strings and are subjected to freezing temperatures for extended periods of time after the wells are drilled. When this occurs, casing collapse or rupture can result from the severe stresses imposed by the volume increase of the freezing water. Additionally, since oil and gas produced is generally at elevated temperatures, e.g., greater than 150° F., considerable thawing and softening of the normally hard permafrost around the borehold occurs. This leads to subsidence of the earth and damage to the casing and tubing.

U.S. Pat. No. 3,831,678, incorporated herein by reference, contains a discussion of prior art techniques which have been tried in an attempt to solve the problems discussed above with regard to the production of oil and gas through permafrost. Additionally, U.S. Pat. No. 3,650,327 discloses a method for effecting thermal insulation of wells such as, for example, a well through a permafrost zone.

In the method described and claimed in U.S. Pat. No. 3,831,678, an oil based packer fluid is utilized, the packer fluid containing an organic modified clay which is a gellant for oleaginous mediums. The gellants employed do not function effectively at temperatures less than about 50° F. However, upon raising the temperature of the well packer fluid above about 50° F., gelation occurs, the degree of which depends upon the composition of the packer fluid and the temperature to which it is subjected. The method disclosed in U.S. Pat. No. 3,831,678 is inherently limited to use in at temperatures below about 50° F. since at higher temperatures the packer fluid thickens and can accordingly, not be pumped into an annulus of a well bore to serve as an insulating medium.

SUMMARY OF THE INVENTION

It is therefore an object of the present invention to provide an improved method for insulating a well.

Still a further object of the present invention is to provide a method for preparing an oil base packer fluid.

A further object of the present invention is to provide a method for insulating a well bore through which a fluid passes between a sub-surface formation and the surface of the earth.

The above and other objects of the present invention will become apparent from the description given herein and the appended claims.

In the method of insulating a well bore provided by the present invention, a packer fluid is placed, as by pumping, at a temperature below about 120° F., in an annular space in the well bore and thereafter the temperature within the well bore is raised to above about 130° F., to effect gelation of the packer fluid within the annulus. The packer fluid used in the present method comprises an oleaginous phase, e.g. a hydrocarbon oil, and an aqueous phase, e.g. a sodium chloride solution. The packer fluid further includes a water-in-oil emulsifier, lime and an oleophilic polymeric material selected from the class consisting of polymers of an alkenylsuccinic anhydride containing from about 2 to about 8 alkenylsuccinic anhydride molecules per molecule of polymer, copolymers of an alpha-olefin containing from 10 to 24 carbon atoms and maleic anhydride and mixtures thereof. A weighting material such as barite can also be incorporated into the packer fluid if desired.

In the method of producing the packer fluids of the present invention for use in the insulation method, the ingredients enumerated above are admixed and maintained at a temperature below about 120° F.

DESCRIPTION OF THE PREFERRED EMBODIMENTS

The oleaginous liquid or phase in the fluids used in the methods of the present invention are usually petroleum oils (hydrocarbons). Preferably, the oleaginous liquids should contain at least some component boiling above the gasoline boiling range, i.e. above about 400° F. at atmospheric pressure. Oils with too high a content of highly volatile hydrocarbons in the gasoline boiling range are undesirable because of the danger of fire, and because of their low viscosity. It is preferred that the oleaginous liquid have a flash point above about 140° F. Non-limiting examples of suitable oleaginous liquids which can be employed in the practice of the invention include the following: topped crude oil, gas oils, kerosene, diesel fuels, heavy alkylates, fractions of heavy alkylates, and the like. The more preferred oils are predominantly paraffinic in character since these are less detrimental to rubber components in pumps, lines, etc. It is preferred that the oleaginous liquid have a gravity within the range of 15-40 API.

The packer fluids will, generally speaking, contain the oleaginous liquid, the continuous phase, as the major portion, and the aqueous phase as the minor portion. Thus, the volume ratio of the oleaginous phase to the aqueous phase can be in a volume ratio of from about 49/1 to about 3/1, preferably from about 20/1 to about 3/1. The aqueous phase can be fresh water or a solution of water and a brine forming, water soluble salt such as sodium chloride, calcium chloride and the like. The amount of the water soluble salt in the acqueous phase will vary depending on the conditions under which the packer fluid is used.

The oleophilic polymers employed in the packer fluids of the present invention are those which are soluble in the oleaginous phase. Suitable polymers include polymers of alkenylsuccinic anhydride wherein the polymer contains from about 2 to about 8, perferably from about 2 to about 4 molecules of the anhydride monomer per molecule of polymer. It is preferred that the alkenyl group in the alkenylsuccinic anhydride polymers contain at least 10 carbon atoms, perferably from 10 to 24 carbon atoms, especially from 12 to 18 carbon atoms. In addition, the polymers can comprise a copolymer of an alpha-olefin containing from 10 and 24, preferably 18 to 24, carbon atoms with maleic anhydride, the olefin to maleic anhydride molar ratio being from about 1.5:1 to about 1:1.5, preferably 1:1. Preferably, the olefin-maleic anhydride copolymer will contain from about 4 to about 6 anhydride groups per molecule of polymer. Mixtures of the oleophilic polymers can also be employed. The term "anhydride," as used herein, is intended to include dicarboxylic acids in which the carboxyl groups are suitably situated with respect to one another to form cyclic anhydrides by the elimination of one molecule of water.

The oleophilic polymer will be present in the fluid, in an amount sufficient to impart the desired consistency or viscosity to the fluid when it is heated sufficiently, i.e. above 130° F. In general, however, the polymer will be present in amounts of up to about 10 pounds per barrel (ppb), preferably from about 5 to about 10 ppb. Such a concentration of polymer provides an easily pumpable material.

The lime which is also a major component of the packer fluid, includes calcium oxide as well as any of the various chemical and physical forms of quicklime, hydrated lime, etc. The lime will be present in the fluids in an effective amount, up to and including about 15 ppb. Preferably, the lime concentration will be at least equal to 50% of the concentration (wt) of the polymer and most preferably at least equal to 150% of the concentration (wt) of the polymer.

Although the lime and the anhydride polymer act, to some extent, as water-in-oil emulsifiers, it is preferred, for ease of preparation, that an invert emulsifier such as disclosed in U.S. Pat. Nos. 2,861,042, 2,946,746, 3,259,572, 3,346,489, 3,590,005, or 3,654,177 be employed. Mixtures of various emulsifiers can be used, if desired. Whem employed, the emulsifier will be present in an amount of from about 2 to about 15 ppb, more preferably from about 5 to about 15 ppb.

The packer fluid of the present invention can also contain, with advantage, weighting agents such as barite, fluid loss control agents, such as those disclosed in U.S. Pat. Nos. 3,168,475 and 3,494,865, and suspension agents. When a weighting agent such as barite is added, it is generally preferred that the packer fluid contain a suspension agent. Preferred suspension agents are the organic modified clays which are commonly used as gelants or thickeners in oleaginous mediums. Such organic modified clays and their preparation are adequately described in the following U.S. Patents, each of which are herein incorporated by reference: U.S. Pat. No. 2,531,427; U.S. Pat. No. 2,531,812; and U.S. Pat. No. 2,966,506.

It is also desirable, although not absolutely necessary if no weighting agent is employed, to add small amounts of a suspension agent such as one of the organic modified clays discussed above to the packer fluid when it is prepared. When used, and particularly when a weighting agent is employed, the suspension agent will be present in amounts of from about 3 to about 6 ppb of the packer fluid.

In formulating the packer fluid of the present invention, it is necessary that the packer fluid by kept at a temperature below about 120° F. to prevent viscosification or thickening prior to the desired time. Although the order of mixing of the ingredients is not particularly critical, it is common practice to add the oleophilic polymer and lime last. Accordingly, it is possible to mix the other ingredients at elevated temperatures, cool the mixture to below 120° F. and then add the oleophilic polymer and lime. In certain cases such a procedure may be desirable to expedite mixing of the component. As long as the packer fluid is kept at a temperature below about 120° F., it remains fluid and pumpable and thereby can easily be transported for use at the well site. A particular advantage of the packer fluid of the present invention, as opposed to the packer fluid disclosed in U.S. Pat. No. 3,831,678, stems from the fact that the packer fluid herein can be used in warm and even tropical climates as well as in frigid climates where permafrost exists. Thus, for example, it may be desirable to use the packer fluid in a warm climate as an insulating medium in injection wells where a hot fluid is pumped into the well to facilitate recovery of the sub-surface mineral.

In the method of insulating a well bore in accordance with the present invention, the packer fluid described above is disposed, as by pumping, in an annular space in the well bore. Generally speaking, the annular space is formed by two or more concentrically disposed strings of pipe or casing which extend from the surface of the earth to some sub-surface formation. In the method of the present invention, the packer fluid is disposed in the annular space at a temperature below which viscosification occurs. To viscosify the packer fluid to the proper consistency, it is only necessary to raise the termperature of the packer fluid in the annular space to above about 120° F. This can be done either by permitting a formation fluid, at a temperature about 130° F., to flow upwardly to the surface and in the process heat the packer fluid in the annular space or alternatively, it is possible to pump the packer fluid into the annular space and the inject into the well bore a heated fluid which will raise the temperature of the packer fluid to above about 130° F. and effect viscosification. Once the packer fluid in the annular space has reached a grease-like consistency, it forms a highly effective insulating barrier.

To more fully illustrate the present invention, the following non-limiting examples are presented. In the examples, the following abbreviations, units of measure and notations are used: ppb = pounds per 42 gallon barrel; plastic viscosity = centipoise, % = percent by weight; all gel strengths, shear and yield points are measured in pounds per hundred square feet. All tests results were obtained in accordance with standard API procedures (API RP 13B, Seventh Edition, April, 1978). The maleic anhydride alpha-olefin copolymers were obtained from Gulf Oil Chemicals Company and are the reaction products of alpha-olefins having from 16 to 18 carbon atoms per molecule with maleic anhydride. The comonomers are present in a 1:1 moler ratio. The copolymers contain from about 4 to about 6 anhydride groups per molecule.

EXAMPLE 1

A 350 ml volume of a 12 lb/gal base fluid was prepared by adding 12.5 g of a water-in-oil emulsifier (EZ MUL, product of Baroid Division, NL Industries, Inc.), 9 ml water, 1.5 g of sodium chloride and 6 g of an organophilic clay (GELTONE, product of Baroid Division, NL Industries, Inc.) to 259 ml of diesel oil. The mixture was stirred with a Hamilton Beach mixer for 20 minutes at room temperature. A 224 g sample of barite (weighting material) was added after the first 10 minutes of stirring. The base fluid was cooled to 32-34° F. in an ice bath. To one sample of the base fluid (Sample Mark A) was added 10 g of maleic anhydride-alpha olefin copolymer and 15 g of lime. To another sample of the base fluid (Sample Mark B) was added 33 g of GELTONE, as per the method disclosed in U.S. Pat. No. 3,831,678. The cold samples thus prepared were placed on a Fann 35 Viscometer and the rheology periodically measured while heating the samples up to 160° F. Between measurements, the samples were stirred at 600 rpm on a Fann 35 Viscometer. The samples were then allowed to cool to room temperature (about 76° F.)

following which the samples were placed into a pressured cell for static aging at 200° F. Table I below demonstrates the effect of increasing temperature on the yield.

TABLE I

| SAMPLE MARK<br>Temperature °F. | A | B |
|---|---|---|
| | Yield Point | |
| 40° | 2 | 4 |
| 50° | 0 | 36 |
| 60° | 0 | 200 |
| 70° | 0 | 250 |
| 80° | 0 | 260 |
| 90° | 0 | 245 |
| 100° | 0 | 240 |
| 120° | 0 | 225 |
| 140° | 0 | 200 |
| 160° | 175 | 195 |
| Cooled to 76° F. | | |
| Shear Strength | 200 | 100 |
| Aged at 200° F. for 16 hours then cooled to 76° F. | | |
| Shear Strength | 250 | 165 |

EXAMPLE 2

A 1400 ml volume of packer fluid was prepared by adding 50 g EZ MUL, 336 ml of water (70/30 oil/water ratio), 184 g calcium chloride, 8 g GELTONE and 730 g barite to 798 ml of diesel oil. The mixture was stirred for 20 minutes at room temperature with a Lightnin mixer followed by the addition of 20 g of the maleic anhydride-alpha olefin copolymer and 40 g of lime. Stirring of the mixture was continued as the sample was heated to 140 ° F. over a 10 minute period. An increase in thickening of the packer fluid was observed at a temperature around 110° F. The fluid was cooled to 76° F. and the shear strength measured. The sample was then divided into four equal volumes which were placed into steel aging cells and static aged 16 hours at various temperatures. A fifth sample was aged at about room temperature. The results of various rheological and physical property measurements are shown in Table II below.

TABLE II

| SAMPLE MARK | 1 | 2 | 3 | 4 | 5 |
|---|---|---|---|---|---|
| Aging Temperature, °F. | 200 | 300 | 375 | 425 | 74 |
| Aging Time, hr | 16 | 16 | 16 | 16 | 16 |
| Shear at 76° F. | 100 | 80 | 50 | 50 | 40 |
| Top Oil Separation, 1/32" | Trace | 0 | 6 | 48 | 0 |
| Settling in Cell | none | none | none | slight | none |
| Electrical Stability, volts | 200 | 210 | 180 | 180 | 200 |
| Stirred, min | 10 | 10 | 10 | 10 | 10 |
| Plastic Viscosity | 135 | 125 | 125 | 90 | 130 |
| Yield Point | 40 | 75 | 145 | 185 | 35 |
| 10-sec Gel | 110 | 50 | 85 | 145 | 45 |
| 10-min Gel | 150 | 90 | 225 | 375 | 80 |
| Electrical Stability, volts | 200 | 200 | 180 | 180 | 200 |

As can be seen from the data in Table I, the present invention provides an ideal method for insulating a well bore as, for example, through a permafrost zone. Since the packer fluid remains pumpable at temperatures up to around 120° F., it can be easily displaced down a string of casing and disposed in a suitable annulus, after which the temperature can be raised sufficiently to cause thickening of the packer fluid thereby forming an insulating material in the annulus. As can also be seen from the data in Table II, the thickened packer fluid is stable at relatively high temperatures, e.g. greater than 300° F.

While the invention has been described with reference to the insulation of a well bore, it is to be understood that it is equally applicable to the insulation of pipe lines through permafrost zones and, more generally, as a method of forming a thermal barrier across any annulus.

The invention may be embodied in other specific forms without departing from the spirit or essential characteristics thereof. The present embodiments are therefore to be considered, in all respects as illustrative and not restrictive, the scope of the invention being indicated by the appended claims rather than by the foregoing description, and all changes which come within the meaning and range of equivalence of the claims are therefore intended to be embraced therein.

We claim:

1. A method for insulating a well bore through which a fluid passes between a sub-surface earth formation and the surface of the earth comprising the steps of:
   drilling a borehole from said surface;
   forming an annular space in said borehole;
   pumping, at a temperature below about 120° F., a packer fluid into said annular space, said packer fluid comprising a liquid oleaginous phase, an aqueous phase, lime, an oleophilic polymer selected from the class consisting of polymers of an alkenylsuccinic anhydride containing from about 2 to about 8 alkenylsuccinic anhydride molecules per molecule of polymer, copolymers of an alpha-olefin containing from 10 to 24 carbon atoms and maleic anhydride and mixtures thereof, and a water-in-oil emulsifier; and
   raising the temperature of said packer fluid in said annular space to a temperature above about 130° F.

2. The method of claim 1 wherein the volume ratio of said oleaginous phase to said aqueous phase is from about 49/1 to about 3/1.

3. The method of claim 1 wherein said oleaginous phase comprises a hydrocarbon oil, at least a part of which boils above 400 ° F., and which is selected from the class consisting of topped crude oil, gas oil, kerosene, diesel, fuel, heavy alkylate, fractions of heavy alkylate, and mixtures thereof.

4. The method of claim 1 wherein said oleophilic polymer is present in an amount of from about 5 to about 10 ppb of said packer fluid.

5. The method of claim 1 wherein said alkenyl group contains at least 10 carbon atoms.

6. The method of claim 1 wherein the mole ratio of said alpha-olefin to maleic anhydride in said copolymer is in the range of from about 1.5 to 1 to about 1 to 1.5.

7. The method of claim 1 wherein said copolymer contains from about 4 to about 6 maleic anhydride molecules per molecule of copolymer.

8. The method of claim 1 wherein said lime is present in an amount of from 8 to about 15 ppb of said packer fluid.

9. The method of Claim 1 wherein said water-in-oil emulsifier is present in an amount of from about 2 to about 15 ppb of said composition.

10. The method of claim 1 wherein said lime is present in an amount at least equal to 150% of the concentration of said oleophilic polymer.

11. The method of claim 1 wherein said packer fluid includes a suspension agent.

12. The method of claim 11 wherein said packer fluid includes a weighting agent.

13. The method of claim 1 wherein said temperature is raised by passing a heated fluid through said borehole.

14. The method of claim 1 wherein said annular space is formed by extending into a borehole a first tubular casing having a first diameter and extending into said borehole a second tubular casing having a second, smaller diameter.

15. The method of claim 1 wherein said temperature is raised by passing a heated fluid through said second tubular casing.

16. A method of forming a thermal barrier across an annulus comprising:

substantially filling said annulus with a fluid comprising a liquid oleaginous phase, an aqueous phase, lime, an oleophilic polymer selected from the class consisting of polymers of an alkenylsuccinic anhydride containing from about 2 to about 8 alkenylsuccinic anhydride molecules per molecule of polymer, copolymers of an alpha-olefin containing from 10 to 24 carbon atoms and maleic anhydride, and mixtures thereof, and a water-in-oil emulsifier;

heating said fluid in said annulus to a temperature above about 130° F. for a time sufficient to gel the fluid in said annulus to a substantially grease-like consistency.

17. The method of claim 14 wherein said annulus is formed between substantially concentrically disposed pipe sections.

* * * * *

UNITED STATES PATENT AND TRADEMARK OFFICE
CERTIFICATE OF CORRECTION

PATENT NO. : 4,258,791
DATED : March 31, 1981
INVENTOR(S) : Israel M. Brandt, Forrest A. Scearce It is certified that error appears in the above—identified patent and that said Letters Patent is hereby corrected as shown below:

In Column 6, line 39, after the word "diesel" delete ",".

In Column 8, line 10, delete "14" and insert therefor "16".

Signed and Sealed this

Eleventh Day of December 1984

[SEAL]

Attest:

GERALD J. MOSSINGHOFF

Attesting Officer

Commissioner of Patents and Trademarks